Jan. 6, 1931.  E. P. BORDEAUX  1,787,892
DUMPING UNIT FOR MOTOR TRUCKS
Filed Feb. 20, 1929   2 Sheets-Sheet 1
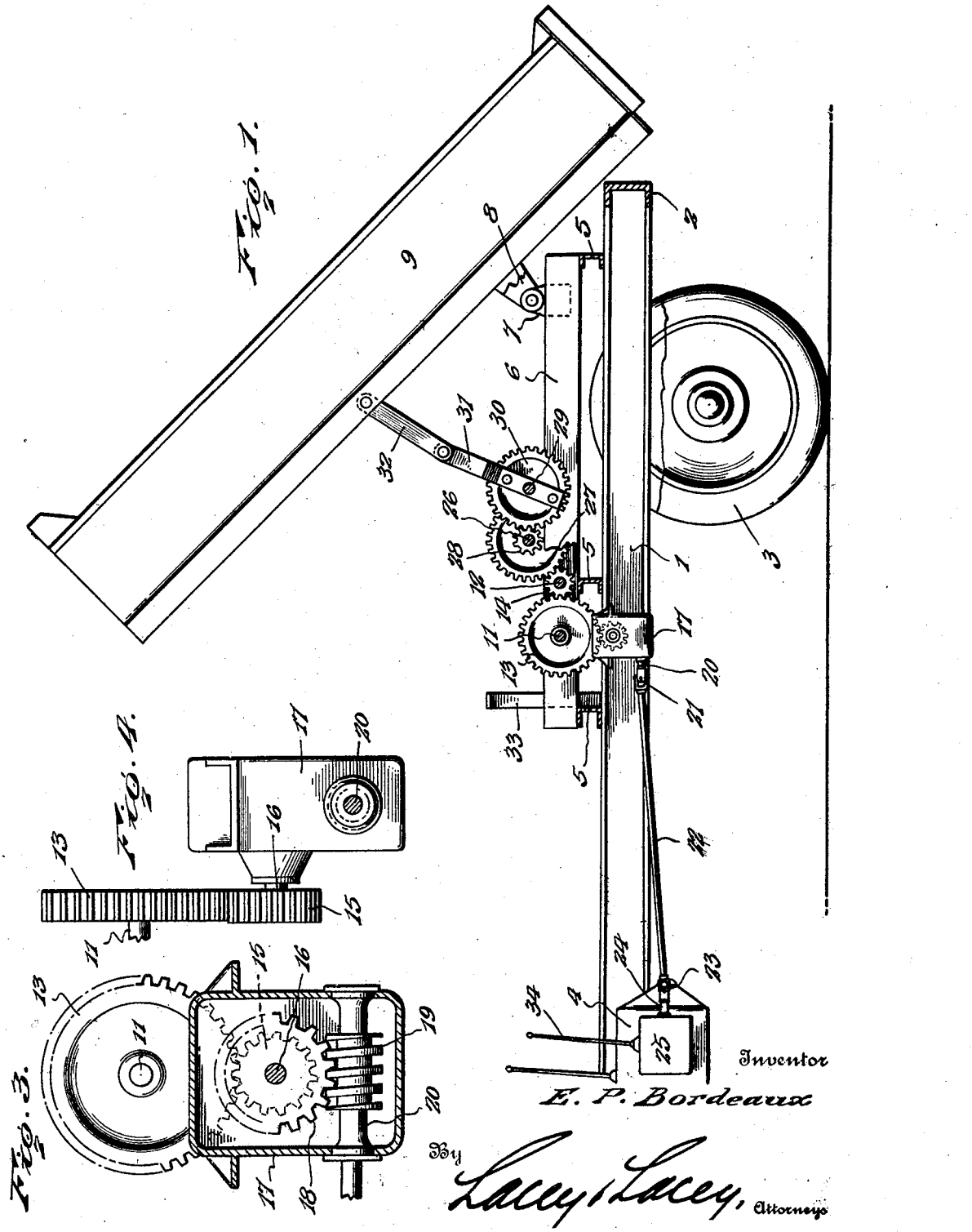
Inventor
E. P. Bordeaux
By Lacey & Lacey, Attorneys

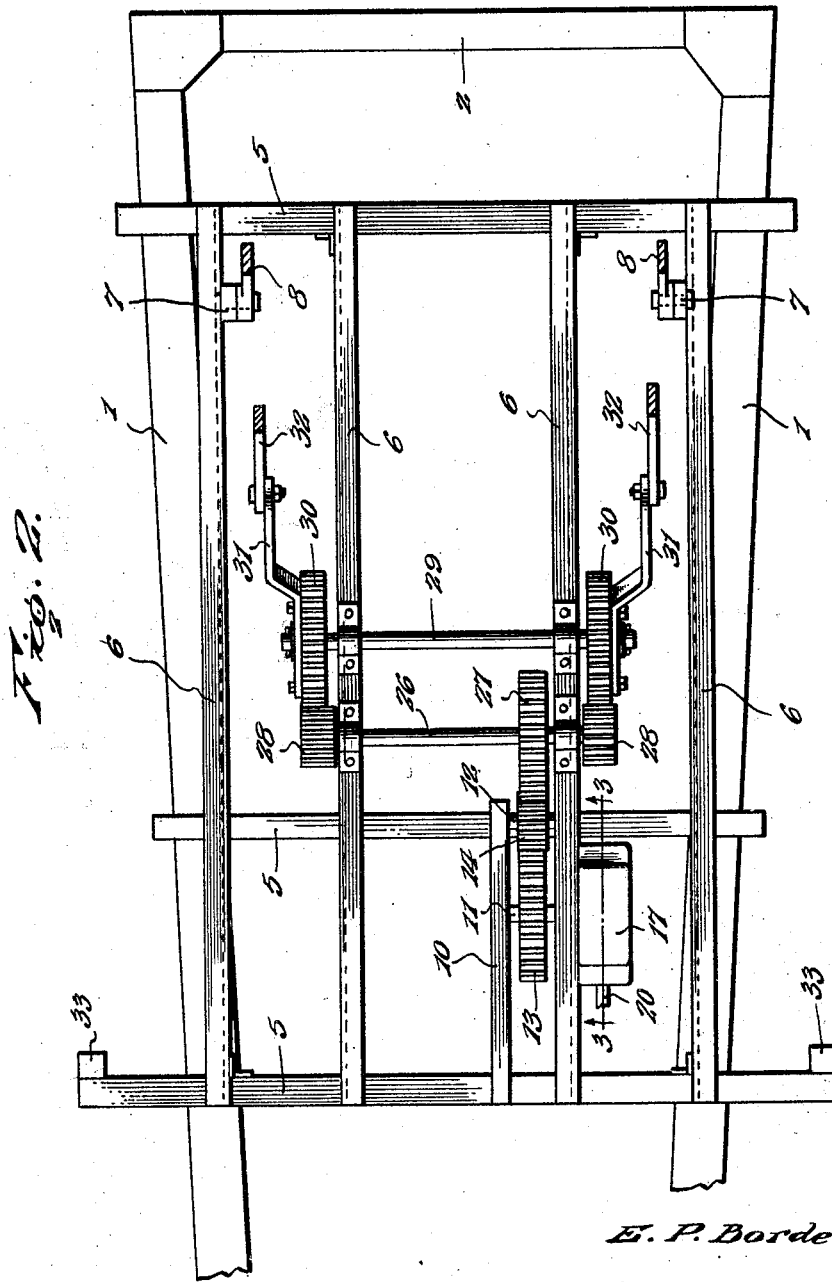

Patented Jan. 6, 1931

1,787,892

UNITED STATES PATENT OFFICE

EPHRIAM PETER BORDEAUX, OF GALION, OHIO, ASSIGNOR TO PERFECTION STEEL BODY CO., OF GALION, OHIO, A CORPORATION OF OHIO

DUMPING UNIT FOR MOTOR TRUCKS

Application filed February 20, 1929. Serial No. 341,497.

This invention has for its object the provision of a dumping body unit which may be mounted upon a motor truck chassis and operated by power from the motor of the truck. A particular object of the invention is to provide a raising and lowering mechanism which will be so disposed that it will continue to operate until the power is cut off so that, if the operator should fail to cut off the power when the body has been raised to dumping position, no accident will occur and stripping of the gears will be prevented. The invention is illustrated in the accompany drawings and will be hereinafter fully set forth.

In the drawings:

Figure 1 is a side view, partly in section, of a dumping unit embodying the invention and applied to a motor truck chassis, Fig. 2 is a plan view, partly in horizontal section, of the same, Fig. 3 is an enlarged detail section of the worm gearing and its case on the line 3—3 of Fig. 2, and Fig. 4 is a detail sectional elevation of the device shown in Fig. 3.

The truck chassis may be of any approved form, and in the drawings I have shown the side bars or sills 1 thereof, the rear cross bar 2 of the same and the rear ground wheels 3. A portion of the transmission gearing is indicated in a conventional manner at 4 in Fig. 1.

In carrying out the present invention, there is provided a supplemental or auxiliary frame including cross bars 5 which may be provided in any desired number and are preferably channel bars set on edge, as shown most clearly in Fig. 1. These cross beams are placed directly upon the sills of the chassis and may be riveted or otherwise securely fastened thereto. Resting upon and secured to the cross bars 5 are longitudinal bars 6, four of which are shown and which are arranged parallel through their entire length. The outer bars 6 are disposed over the respective sills 1, as shown most clearly in Fig. 2, while the inner bars are disposed at opposite sides of the central longitudinal line of the frame but nearer the outer bars than each other. Adjacent the rear ends of the outer longitudinal bars 6, hinge brackets 7 are secured thereon, and to these brackets are pivotally attached the hinge members or brackets 8 which are secured to the dumping body 9 and depend therefrom, as shown in Fig. 1. Disposed upon the forward cross bars 5 is a short longitudinal bar 10 which is disposed parallel with and rather close to the inner bar 6 at the left hand side of the frame. The bar 10 and the adjacent bar 6 provide supports for a forward shaft 11 and an intermediate stud shaft 12, the shaft 11 carrying a spur gear 13 which is disposed between the bars 6 and 10, as shown clearly in Fig. 2, and the stud shaft 12 carrying a pinion 14 which meshes with the gear 13 and is disposed also between the bars 10 and 6. The gear 13 also meshes with a pinion 15 which is disposed below the gear and is carried by the outer end of a shaft 16 extending into a gear case 17 which is mounted upon the outer side of the bar 6 in any convenient manner. The case 17 houses a worm gear 18 which is secured upon the shaft 16 and meshes with a worm 19 upon a shaft 20 which is journaled in the case, as shown in Fig. 3, and extends through the front side of the same. The shaft 20 is connected by a universal joint 21 with a transmission shaft 22 having its front end connected by a universal joint 23 with a shaft 24 extending from a gear case 25 which is disposed around and houses a power take-off device connected with the transmission gearing 4 or with the motor shaft and which may be of any approved type, detailed illustration and description of the same being deemed unnecessary inasmuch as, in itself, it forms no part of the present invention.

Disposed at the rear of the shaft 12 and the pinion 14 thereon is a counter-shaft 26 which is mounted in bearings provided therefor upon the inner longitudinal bars 6 and has secured thereon a gear 27 which meshes with the pinion 14 whereby the shaft 26 will be rotated. The ends of the shaft 26 are extended laterally beyond their bearings and are equipped with pinions 28 adjacent the outer sides of the inner bars 6, as shown in Fig. 2. Parallel with and at the rear of the shaft 26 is the lifting shaft 29 which is also mounted in bearings provided therefor upon the inner bars 6 and is equipped at its ends with gears 30 meshing with the respectively adjacent pinions 28. Upon the outer side of each gear 30 and disposed across a diameter of the gear is a lifting arm or lever 31, and it will be noted particularly upon reference to Fig. 2 that said levers or lifting arms are offset whereby their working ends will be arranged to clear the gears and the pinions meshing therewith and work in the free space provided between the inner and outer bars 6. To the outer ends of the arms 31 are pivoted the lower ends of links 32 which extend to the dumping body 9 and have their upper ends pivoted to the bottom of the body.

At the ends of the foremost cross bar 5 are secured posts 33 which constitute stops and rests for the front end of the dumping body 9 so that the body will be supported in its lowest position without imposing undue strain upon the links 32 and the lifting arms or levers 31.

It will be understood that, when the dumping body is to be raised and tilted to discharge a load, the truck is driven to the point of delivery and the power take-off device, indicated at 25, is thrown into action, a hand lever 34 being provided for this purpose adjacent the cab of the truck. The power of the engine will then be transmitted through the shafts 24, 22 and 20 to the worm gearing so that the shaft 16 will be rotated and the motion of said shaft will be transmitted through the shown and described gearing to the lifter shaft 29. The rotation of the shaft 29 will be transmitted directly to the lifter arms 31 so that the outer ends of said arms will be swung upwardly and will transmit a lifting force through the links 32 to the dumping body 9. As the arms 31 travel upwardly, the force applied thereby through the links 32 to the dumping body will cause the body to swing about its hinge connection with the auxiliary frame and assume the position shown in Fig. 1, whereupon the load will be discharged. With the dumping bodies as now generally mounted, it is intended that the operator should cut off the power just as the discharging position is reached but the operators are not always vigilant and skillful and it frequently happens that the power is not cut off at the proper moment and the motion of the lifting arms continues. As the mechanism is now most generally arranged, the continued movement of the lifting arms after the dumping position has been reached by the body causes serious accidents and strips the gears so that the truck is put out of commission and considerable expense for repairs incurred. With my present arrangement, the lifting arms are arranged to operate in a free space so that, if the power should not be cut off, the lifting arms will simply continue to rotate uninterruptedly and the dumping body will be alternately lowered and raised until the operator's attention is caught and the power is cut off. It will be noted that the parts are arranged especially to provide for a free continued complete rotation of the lifter arms, whereas with the arrangements now in use, so far as I am aware, the lifting arms move in one direction to raise the body to dumping position and then must reverse the motion and travel in the opposite direction in order to lower the body. All the working parts of my apparatus are disposed between the sides of the truck chassis so that they are not apt to catch in the clothing of the operator or any person adjacent the truck and thereby cause serious injury, and it is obvious that the entire device may be prepared as a complete unit and mounted upon any truck chassis in a short period of time and no alteration or reconstruction of the truck chassis will be necessary. The tumbler shaft consisting of the several sections connected by universal joints may be readily connected with any power take-off device and if the truck should not be equipped with such a device any known power take-off may be added to the engine without involving any change in the apparatus of the invention.

Having thus described the invention, I claim:

A dumping unit for motor trucks comprising an auxiliary frame consisting of a series of cross bars adapted to rest on and be secured to side bars of a truck chassis, inner and outer longitudinal bars secured on said cross bars in transversely spaced relation to each other, a lifter shaft rotatably mounted upon the inner longitudinal bars and extending across the same with its ends projecting therefrom, a dumping body hingedly mounted upon the outer longitudinal bars adjacent the rear ends thereof, gears fitted upon the ends of the lifter shaft, lifter arms secured against the outer faces of said gears and projecting radially therefrom, links connecting the lifter arms with the dumping body, a counter-shaft rotatably mounted on the auxiliary frame in advance of the lifter shaft, pinions carried by the countershaft and meshing with the gears of the lifter shaft, worm gearing mounted on the forward portion of the auxiliary frame, a tumbler shaft adapted to connect said worm gearing with a power take-off, and gearing connecting the worm gearing with the counter-shaft.

In testimony whereof I affix my signature.

EPHRIAM P. BORDEAUX. [L. S.]